(No Model.)

C. FEY.
APPARATUS FOR MANUFACTURING MALT.

No. 429,124. Patented June 3, 1890.

WITNESSES
C. R. Ferguson
Fred Lumker

INVENTOR
Charles Fey
by Gifford & Brown
Attys.

THE NORRIS PETERS CO., PHOTO-LITHO., WASHINGTON, D. C.

UNITED STATES PATENT OFFICE.

CHARLES FEY, OF BROOKLYN, NEW YORK.

APPARATUS FOR MANUFACTURING MALT.

SPECIFICATION forming part of Letters Patent No. 429,124, dated June 3, 1890.

Application filed November 5, 1889. Serial No. 329,283. (No model.)

*To all whom it may concern:*

Be it known that I, CHARLES FEY, of Brooklyn, New York, have invented a new and useful Improvement in Apparatus for the Manufacture of Malt, of which the following is a specification.

In the manufacture of malt it is necessary that the barley or other grain from which it is made should be submitted to such conditions as to cause it to germinate or "grow." These conditions heretofore have been generally obtained by spreading the same upon the floor and frequently turning it by hand-shovels. Various apparatuses have been proposed for performing the operation automatically, but generally with very little success, by reason of complication of machinery, expense of construction, and indifferent results in economy and quality of the product.

The object of my present invention is to overcome all of these difficulties, and by a simple inexpensive apparatus to manipulate the grain economically and with better results in quality and yield of malt than have ever been achieved even by the old hand process.

Figure 2:
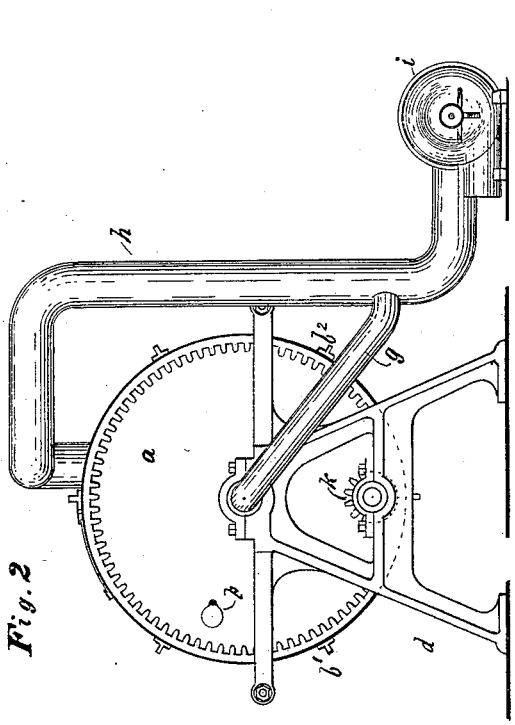
Figure 1:
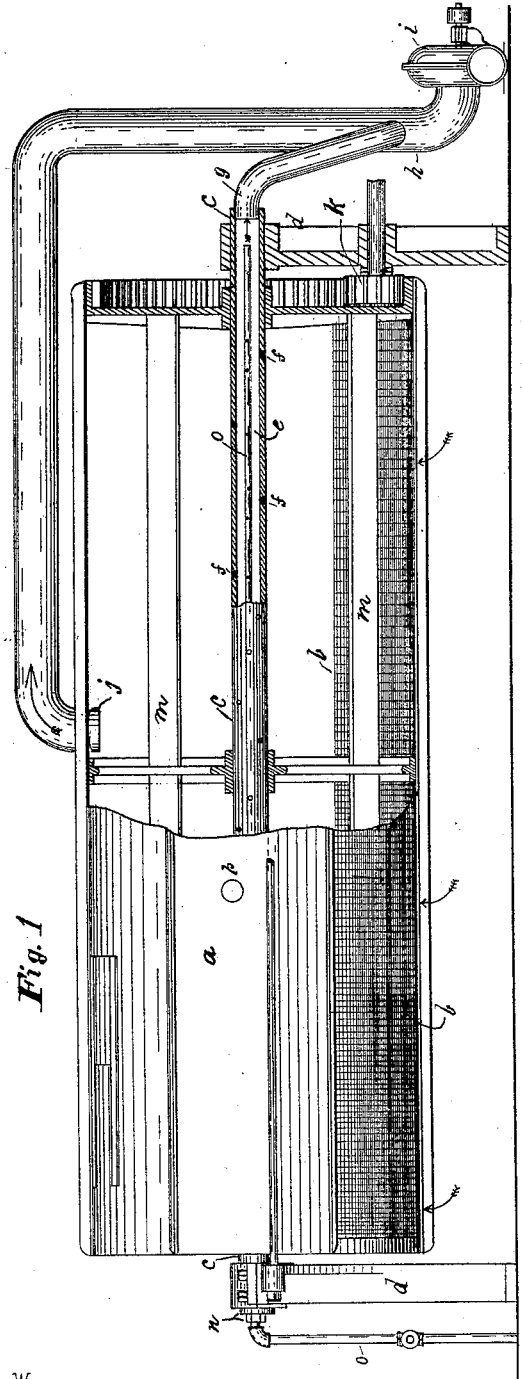
Figure 3:
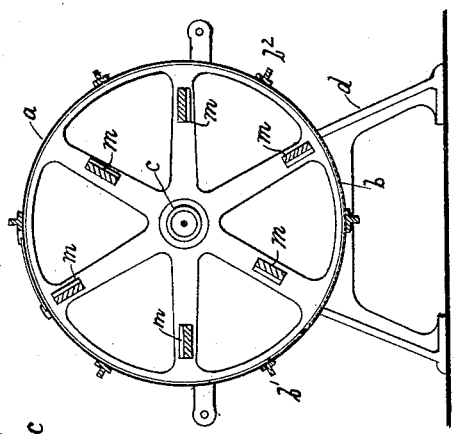
Figure 4:
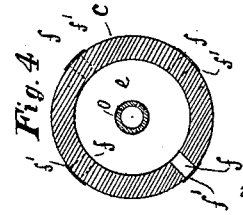

In the drawings, Figure 1 is a side view of the apparatus, partly in section. Fig. 2 is an end view of the same. Fig. 3 is a cross-section of the same. Fig. 4 is a cross-section of the center shaft and of the water-distributing pipe on a larger scale than the other figures.

$a$ is a drum closed at all parts excepting for about one-third of its circumference, where its outer or peripheral wall is composed of a perforated sheet-metal or wire screen adapted in size of mesh to retain the grain within the drum and to admit freely of the passage of a draft of air. This perforated portion is lettered $b$ in the drawings and extends from about the point $b'$ to about the point $b^2$ of Fig. 2.

$c$ is a horizontal shaft on which the drum is mounted and which is provided with bearings at each end in the frame $d$. This shaft is hollow, so as to form the internal chamber $e$, which is connected with the interior of the drum by a series of perforations $f f f$, &c., said perforations being covered with screens $f'$, or being of such small size as to exclude the grain from the interior of the pipe while admitting of the passage of a draft of air.

To one end of this hollow shaft is connected by a revolving joint an air-conduit $g$, leading to another air-conduit $h$, which is in turn connected with the exhaust-opening of a fan $i$. The conduit $h$ connects at the other end with an opening at $j$ into the interior of the drum at a point which, when the drum is at rest, will be on top, as shown in Figs. 1 and 2.

Now it will be observed that by starting up the fan-blower with the parts in the position shown in Figs. 1 and 2 the air will be sucked out of the drum and of the shaft $c$ through the conduits $g$ and $h$. To supply the vacuum thus formed within the shaft $c$, air will enter from the interior of the drum through the perforations $f$. To supply the air thus (and by the conduit $h$) taken from the interior of the drum, outside air of, say, the ordinary temperature of about 60° will be taken in through the perforated wall-section $b$. Since the opening to the conduit $h$ is at the top of the drum, and the perforated wall-section $b$ is at the bottom of the drum, and the drum will in practice be, say, two-thirds full, leaving an air-space above the grain extending from the opening $j$ to each end of the drum, the air which passes into the drum through the perforated wall-section $b$ will be equably distributed throughout all parts of the grain. In passing through the grain the air will encounter about the same depth of grain at all parts of the drum. After the grain has been exposed stationary to this operation for a period, which will be determined by the temperature of the grain, which should not be allowed to rise above 60° to 75° Fahrenheit, it is necessary that the grain should be stirred, and this is accomplished by turning the drum by means of the pinion $k$, operated by suitable power.

The drum will be turned at intervals until the grain has grown sufficiently, which will occupy generally from three and a half to five days. A person skilled in the art of growing by the hand methods heretofore in use will know by inspection of the grain when it is grown sufficiently.

When the cylinder is about to be turned, the pipe $h$ is disconnected at the opening $j$ and that opening closed by any suitable means; then the exhaust continues through the pipe $g$ as the turning proceeds, so that even during the operation of turning there is a forced circulation of air. Stirrers $m\ m$, &c., are fixed within the drum at varying distances from the center, extending longitudinally from one end of the drum to the other, so that as the drum revolves the grain will be disturbed and turned over. After the drum has been turned sufficiently it is brought to a standstill in the position shown in Figs. 1 and 2, the conduit $h$ is again connected with the opening $j$, and the previously-described operation is repeated.

For moistening the grain within the drum when required a perforated water-pipe is placed within the chamber $e$, extending longitudinally from one end of the shaft $c$ to the other. This pipe passes out through a cap $n$ at one end of the shaft and is connected with any suitable source of water. When the water is turned on to this pipe, which is lettered $o$, it escapes from the perforations therein into the chamber $e$ and thence through the perforations $f$ into the drum-chamber, where it mixes with the grain. When the water is being thus supplied, the conduit $g$ will be disconnected from the end of the shaft $c$ and a suitable water-tight cap applied in its stead. An opening provided with a slide may be located at $p$ or at any other point which may be convenient, through which the operator may remove a portion of the grain at any step of the process and thus ascertain its condition.

The above-described apparatus affords a means whereby the grain may be submitted to moisture and to an equable application of an air-current and to an intermittent stirring operation, as may be required, without any complicated machinery or expensive apparatus, and my experience goes to show that the results which I obtain are quite superior to any which have been obtained by any means of germination which I have previously been acquainted with.

I claim—

1. In an apparatus for the manufacture of malt, in combination, a drum, an air-suction apparatus, a central perforated pipe, a pipe connecting the air-suction apparatus with said perforated pipe, and a pipe connected with an opening in the periphery of the drum, the periphery of said drum being closed on the semi-circumference adjacent to said opening and being provided with perforations in the semi-circumference opposite to said opening, and the pipe connected with said opening being detachable therefrom, all arranged substantially as set forth, whereby when the drum is stationary the air will be sucked therefrom through said opening and when the drum is being rotated the air will be sucked therefrom through said central perforated pipe.

2. In an apparatus for the manufacture of malt, the combination, with a drum arranged horizontally and having its peripheral wall underneath perforated and its peripheral wall on top closed, of a perforated air-pipe extending longitudinally through the said drum at the center, an air-circulating apparatus, and conduits connecting the same with said perforated pipe and also with an opening in the drum at the top, substantially as described.

CHAS. FEY.

Witnesses:
WM. M. ILIFF,
FRED KEMPER.